United States Patent Office 3,472,137
Patented Oct. 14, 1969

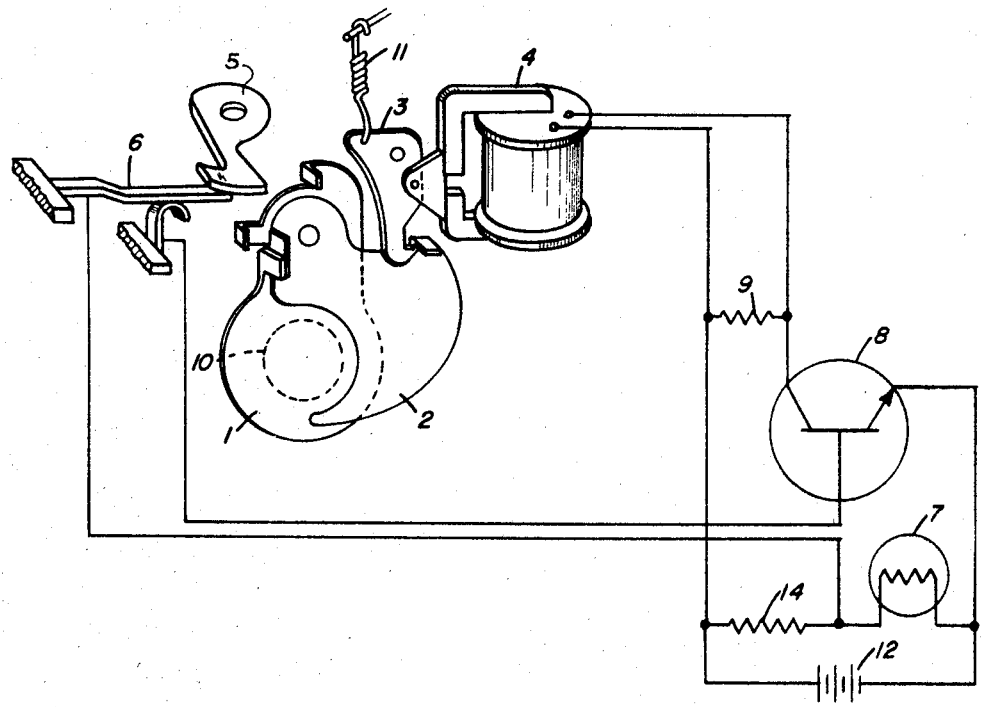

3,472,137
AUTOMATIC SHUTTER MECHANISM
Floyd M. Galbraith, Jr., Rochester, N.Y., assignor to Eastman Kodak Company, Rochester, N.Y., a corporation of New Jersey
Filed Sept. 21, 1966, Ser. No. 581,095
Int. Cl. G03b 7/08, 9/10
U.S. Cl. 95—10                 3 Claims

ABSTRACT OF THE DISCLOSURE

A shutter is automatically controlled by using an electromagnet to control the closing blade. A current is passed through the electromagnet which is inversely dependent on the amount of light striking the photocell. This current is interrupted at the beginning of the exposure interval. The shutter time is controlled by the decay time of the current through the electromagnet since the shutter time is dependent upon the current that has been passing through the electromagnet.

---

This invention relates to an automatic shutter control and more particularly to a shutter which is electromagnetically controlled.

In the prior art, electromagnetic exposure controls have been bulky, complicated and expensive. Furthermore, they have been unreliable.

It is therefore an object of the invention to provide an electromagnetic shutter control which is simple, has few moving parts, and has few electronic components.

These and other objects of the present invention are accomplished by providing a two-blade shutter, one blade being controlled by an electromagnet, and the other blade being controlled by an exposure initiation actuator. When the exposure is initiated, the flow of current through the electromagnet is interrupted. At the same time, one of the shutter blades uncovers the exposure aperture. When the current through the electromagnet has decayed to a value such that the electromagnet can no longer hold the second blade of the shutter open, the blade closes, thus ending the exposure. The steady state current through the electromagnet is determined by a photocell. Thus, the time of exposure is determined by the light falling on the photocell.

The invention will be better understood by refernce to the drawing wherein:

The figure is an electrical-mechanical schematic diagram of a preferred embodiment of the invention.

Referring to the drawing, there is shown a two-blade shutter mechanism comprising shutter blade 1 which covers the exposure aperture before exposure and shutter blade 2 which covers the exposure aperture after exposure. Holding shutter blade 2 in the position shown is a latch 3. This latch is held in the position shown by an electromagnet 4. If the electromagnet 4 loses its electromagnetic force, spring 11 pulls latch 3 away from the electromagnet so that shutter blade 2 falls down to a position covering exposure aperture 10. Connected across the winding of electromagnet 4 is resistor 9. Connected to one terminal of resistor 9 is the collector of a NPN transistor 8. The emitter of transistor 8 is connected to a photocell 7 and to the negative terminal of battery 12. The base of transistor 8 is connected through a switch 6 to the other side of photocell 7 and through a resistor 14 to the positive terminal of battery 12. The positive terminal of battery 12 is also connected to the remaining terminal of resistor 9.

In operation, the camera operator initiates exposure by actuating member 5 (by well-known means not shown). As member 5 swings around, it releases the movable contact of switch 6 from the fixed contact, thus opening the switch. As member 5 swings further, it hits a projection on shutter blade 1, thus opening exposure aperture 10. When switch 6 is opened, the bias to the base of transistor 8 is interrupted, thereby turning off transistor 8. Previous to the initiation of the exposure, the photocell 7 had determined the current through the electromagnet 4 by regulating the bias on the base of transistor 8. As the level of light increased, less current was passed by transistor 8. When the transistor 8 is turned off, the current through electromagnet 4 decays through resistor 9. When the value of current through electromagnet 4 is less than that sufficient to produce the force necessary to hold latch 3 against the force of spring 11, spring 11 pulls latch 3 away from the magnet, thus releasing shutter 2 so that it covers exposure aperture 10. Since a high value of current takes a longer period of time to decay through resistor 9 than does a low value of current, the time of exposure is thereby determined by the amount of light falling on photocell 7.

In an experimental embodiment, shutter speeds were demonstrated having speeds ranging from $\frac{1}{500}$ to $\frac{1}{50}$ of a second. The longest exposure is a function of the battery voltage and the impedance of resistor 9 and electromagnet 4. If the battery voltage can be made high and the impedance of electromagnet 4 and resistor 9 can be made high, the longest possible exposure time can be extended.

The invention has been described in detail with particular reference to preferred embodiments thereof, but it will be understood that variations and modifications can be effected within the spirit and scope of the invention.

I claim:
1. An automatic shutter mechanism for a photographic camera adapted to expose a photosensitive medium to radiation from a secene to be photographed through an exposure aperture, said shutter mechanism comprising:
   (a) a photocell adapted to be exposed to radiation from the scene;
   (b) an electromagnet;
   (c) means coupled to said photocell and to said electromagnet for passing through said electromagnet a current having a value inversely related to the intensity of illumination reaching said photocell;
   (d) means for initiating exposure of the photosensitive medium and for substantially simultaneously interrupting said current to initiate decay of the current through the electromagnet;
   (e) means for terminating exposure of the photosensitive medium, said exposure terminating means being movable from a first position wherein an ex- posure of the medium through said aperture is permitted to a second position wherein exposure of the medium through said aperture is prevented; and (f) means for effecting movement of said exposure terminating means from its first position to its second position in response to a predetermined decay of the current through the electromagnet.

2. An automatic shutter mechanism as in claim 1 in which said current passing means comprises a current source, a resistance is electrically connected across said electromagnet to provide a path for decay of current through the electromagnet, said shutter further comprising a transistor having base, emitter, and collector electrodes, the emitter-to-collector path being connected between said current source and said electromagnet.

3. An automatic shutter mechanism as in claim 1 wherein:

said terminating means comprises a latch and a blade,
said latch being operatively associated with said electromagnet,
said blade being movable between an exposure aperture covering position and an exposure aperture uncovering position, said latch being adapted to hold said blade in an exposure aperture uncovering position during the flow of said current.

References Cited

UNITED STATES PATENTS

| 3,270,650 | 9/1966 | Ernisse. |
| 3,314,346 | 4/1967 | Kremp et al. _____ 95—63 XR |

References Cited

UNITED STATES PATENTS

| 1,394,348 | 2/1965 | France. |
| 1,095,107 | 12/1960 | Germany. |
| 1,178,296 | 9/1964 | Germany. |

NORTON ANSHER, Primary Examiner

JOSEPH F. PETERS, JR., Assistant Examiner

U.S. Cl. X.R.

95—53